United States Patent
Lehmann et al.

(10) Patent No.: US 8,594,382 B2
(45) Date of Patent: Nov. 26, 2013

(54) METHOD AND SYSTEM OF DETERMINING THE FIBER DIAMETER DISTRIBUTION OF A FIBROUS MEDIA

(75) Inventors: Martin Lehmann, Karlsruhe (DE); Holger Bastuck, Stuttgart (DE); Michael Harenbrock, Ludwigsburg (DE); Heiko Brosi, Oberstenfeld (DE); Sylvia Beier-Hoys, Beilstein (DE)

(73) Assignee: Mann+Hummel GmbH, Ludwigsburg (DE)

( * ) Notice: Subject to any disclaimer, the term of this patent is extended or adjusted under 35 U.S.C. 154(b) by 487 days.

(21) Appl. No.: 12/889,447

(22) Filed: Sep. 24, 2010

(65) Prior Publication Data
US 2011/0235867 A1 Sep. 29, 2011

(30) Foreign Application Priority Data
Sep. 29, 2009 (DE) .......................... 10 2009 043 273

(51) Int. Cl.
*G06K 9/00* (2006.01)
(52) U.S. Cl.
USPC .......................................... 382/111; 382/286
(58) Field of Classification Search
USPC ............. 382/100, 111, 286; 348/88; 356/635, 356/429
See application file for complete search history.

(56) References Cited

PUBLICATIONS

Pourdeyhimi et al., "Measuring Fiber Diameter Distributions in Nonwovens," Textitle Res. J., 69(4), 1999, pp. 233-236.*
Ghassemieh et al., "Microstructural analysis of non-woven fabrics using scanning electron microscopy and image processing. Part 1: development and verification methods," Proc Instn Mech Engrs Part L: Materials: Design and Applications, 216 (3), 2002, pp. 199-207.*
Ziabari et al., "A New Image Analysis Based Method for Measuring Electrospun Nanofiber Diameter," Nanoscale Res Lett, 2(12), 2007, pp. 597-600.*
Lehmann et al., "Advanced Fibrous Media Characterization Facilitates Develoment of Innovative Filter Elements," FILTREX 2008, Oct. 7-8, 2008, 8 pages.

* cited by examiner

*Primary Examiner* — Andrew W Johns
(74) *Attorney, Agent, or Firm* — James Hasselbeck

(57) ABSTRACT

A method and system of determining fiber diameter distribution of a fibrous media is disclosed. The method includes providing at least one digital image representative of the fibrous media, pre-processing the images, binarizing the images, generating virtual lines on the image, solving for fiber fringe points on each of generated line, solving for fiber center points as a mean of the fringe points, generating and growing measurement circles about the fiber center points, repositioning circles and center points to avoid fiber intersections, resizing the repositioned measurement circles to intersect the opposing fringes, and calculating fiber diameters and fiber spacing.

11 Claims, 14 Drawing Sheets
(4 of 14 Drawing Sheet(s) Filed in Color)

Pre-process next image (block 120, Fig. 1)

Line generation/ processing (block 130, Fig. 1)

Fig. 4  Fiber diameter determination

Fig. 5  Center point relocation

Fig. 6   Center point movement

Fig. 8    Center point displacement 2

METHOD AND SYSTEM OF DETERMINING THE FIBER DIAMETER DISTRIBUTION OF A FIBROUS MEDIA

CROSS REFERENCE TO RELATED APPLICATIONS

This application claims the benefit under 35 USC 119 of foreign application DE 10 2009 043 273.6 filed in Germany on Sep. 29, 2009, and which is hereby incorporated by reference in its entirety. The present application claims priority through DE 10 2009 043 273.6 to U.S. provisional patent application No. 61/100,819 filed Sep. 29, 2008 and all of the contents U.S. provisional patent application No. 61/100,819 are incorporated herein by reference and to the fullest extent of the law.

TECHNICAL FIELD

The present invention relates filtration media and, more particularly, to computer automated methods and systems to obtain a fiber diameter distribution of a filter media.

BACKGROUND OF THE INVENTION

The present invention generally relates to methods and systems for characterizing filtration media so as to predict its key performance characteristics. The marketplace for filter products is driven today by the need to more efficient filters with increased dust holding capacity at lower pressure drop. The materials selection and construction of the filter media go a long way to determining eventual filter performance. Key parameters of the fibrous media are porosity and fiber diameter distribution. To optimize filter media performance, today's filter media is a combination of layers with different fiber diameter and/or porosity.

The enhanced performance of filter media is on the one hand achieved by combining different filter media layers, but on the other hand by optimizing the mixture of fiber diameters within one layer. Traditionally cellulose based papers are used as fibrous filters. Cellulose based papers derived from different varieties of wood offer various fiber sizes and shapes. Cellulose paper, however, is a natural product, with all its inherent fluctuation of properties and its limit of minimum fiber diameter. Another filter media material is synthetic non-woven media, which is a highly technical product offering many more parameters to control product quality and properties, e.g. smaller fibers. Consequently, a trend is developing to add synthetic media to or on top of cellulose or even shifting to fully synthetic filter media.

It is well known that the fiber diameter size predetermines particle collection efficiency. However, classical filtration theory does not account for fiber diameter distribution to calculate filtration media performance or pressure drop. As classical filtration theory is based on the single fiber approach, performance can only be predicted for an isolated single fiber diameter. The common approach to overcoming this issue by integrating over different classes of a distribution works for particle diameters, but not for fiber diameters, as "the flow field and collection efficiency associated with each fiber size are influenced by the presence of fibers of other sizes. As a practical matter, the effective fiber diameter, based on pressure drop measurement [ . . . ] is a reasonable approximation" (Hinds 1999).

A common way of determining the fiber diameter distribution in a filter media is to have an operator count the fiber diameters, for example as shown in a scanning electron microscope (SEM) image of the filter media sample. This is a very tedious task and the quality of the measured result depends on the operator. Therefore, automatic image processing has been investigated. Pourdeyhimi and Dent (1999) derived fiber diameter distribution from images by an algorithm using the skeleton and distance transformed image. Talbot et al. (2000) determined fiber diameters by automatic image analysis of cross sectional SEM images fibers. To obtain the fiber cross sections, the fibers had first to be embedded in resin and then cross sections had to be cut. This method is still time consuming. Ghassemieh et al. (2002) applied Fast Fourier Transforms (FFT) to SEM image date to obtain a fiber diameter distribution. Luzhansky (2003) presented an automatic image processing of SEM image based on an algorithm that first finds the pores in a segmented picture and then zigzags around the perimeter of a pore, jumping to the border of the adjacent pore and back by moving forward. Zibari et al. (2007) presented a method to obtain fiber diameter distribution based on binary images. To overcome the problem of methods being based on skeletons, they deleted the fiber intersections. Zibari et al. published (2008) another paper validating their method on simulated structures and comparing the result with data manually measured on SEM images of gold sputtered fibers.

Unfortunately, the past methods of determining the fiber diameter distribution of a filter media have disadvantages. Published or otherwise known methods either generate excessive amounts of data or are too sophisticated using techniques such as fast Fourier transforms (FFT) to allow for a quick and easy judgment of the quality of the fiber diameter sizing. None of the known image processing methods have been found satisfactory to be considered a practical standard way of accomplishing the task. As a result, even today filtration media fiber diameters are commonly counted (manually) by operators such as from SEM images or other known techniques.

SUMMARY OF THE INVENTION

The present invention discloses a method and system of determining fiber diameter distribution of a fibrous media. The method includes providing at least one digital image representative of said fibrous media, pre-processing the images, binarizing the images, generating virtual lines on the image, solving for fiber fringe points on each of generated line, solving for fiber center points as a mean of the fringe points, generating and growing measurement circles about the fiber center points, relocating the center points and resizing measurement circles so circles intersect but do not extend beyond opposing fringes of the fibers, repositioning circles and center points to avoid fiber intersections, resizing said repositioned measurement circles to intersect the opposing fringes, and calculating fiber diameters and fiber spacing.

According to another aspect of the invention, the repositioning step the method further includes adjusting the measurement circles so intersection points on opposing sides of the measurement circles lie upon a line extending through the center point of the circle.

According to another aspect of the invention, the lines are generated at a user defined uniform spacing.

According to another aspect of the invention, the preprocessing step includes adjusting contrast of the digital images and performing image noise reduction by way of a pixel-averaging filter.

According to another aspect of the invention, the binarizing step includes determining a grayscale threshold value using Otsu's method and using the threshold value to convert the image to a binarized image having only white and black pixel values.

According to another aspect of the invention, after the binarization step, the method further includes cleansing the binarized image to remove disconnected areas not representative of fiber size.

According to another aspect of the invention, a computer-readable medium is provided onto which a plurality of executable instructions is stored to execute the methods of the present invention.

According to another aspect of the invention, A computer system for determining fiber diameter distribution of a fibrous media, including a digital computer processor, a non-volatile storage device including an operating system, a display device in communication with the computer processor, a user input device, computer executable code resident upon the non-volatile storage device and executable by the computing system, the computer executable code implementing the methods of the present invention.

According to another aspect of the invention, digital images of the fibrous structure having the calculated measurement circles drawn thereon as displayed on a computer terminal. An operator interacts with the invention to review measurement circles and select measurement circles to be ignored in fiber diameter distribution calculations.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Figure 1:
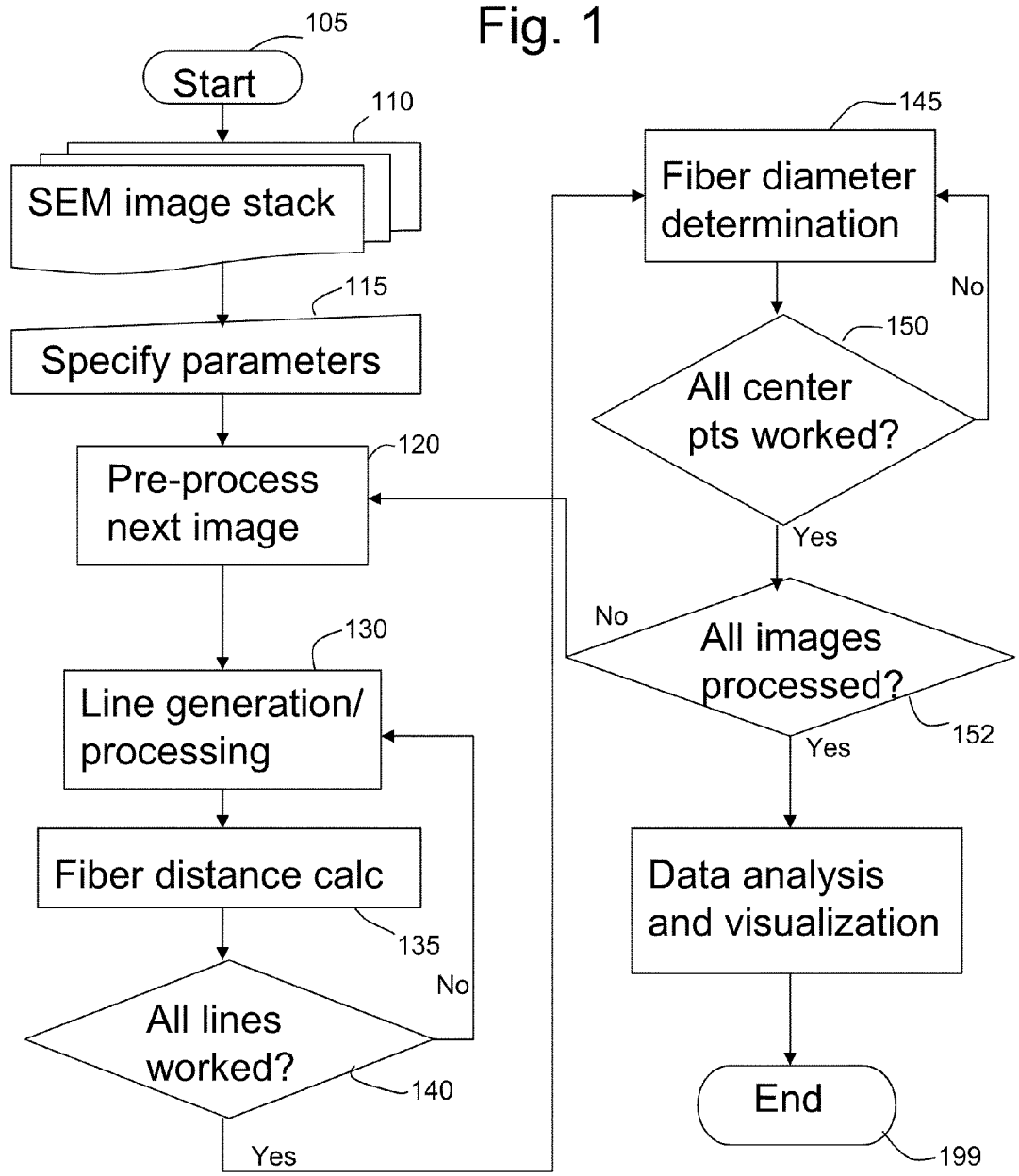
FIG. 1 presents a flow diagram illustrating another embodiment of a computer executed method of automatic determination of the fiber diameter distribution of fibrous media samples, consistent with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a new advanced and computer automated methods and system to obtain the fiber diameter distribution of a fibrous media, such as (for one example) a filter media.

The enhanced performance of today's filter media is on the one hand achieved by combining different layers, but on the other hand by optimizing the mixture of fiber diameters within one layer. Traditionally cellulose based papers are used as fibrous filters. Thereby different woods offer various fiber sizes and shapes. Cellulose paper, however, is a natural product, with all its inherent fluctuation of properties and its limit of minimum fiber diameter. But synthetic non-woven media is a highly technical product, offering a lot more parameters to control product quality and properties, e.g. smaller fibers. Consequently, a trend is developing to add synthetic media to or on top of cellulose or even shifting to fully synthetic media. The present invention generally provides a new advanced and computer automated methods to obtain the fiber diameter distribution of such fibrous media.

The method utilizes automatic image processing, such as cropping the image, adjusting contrast, segmentation (e.g. Otsu's method), closing and removing of small objects. Lines (horizontal, vertical or at any angle) are virtually drawn on the binary image and intersection points of these lines with the fringes of the fibers are computed. Starting points for measuring the fiber diameter are placed in the fibrous areas between to intersection points. In the method fiber diameter is calculated by generating having circles on these starting points that grow until they reach the fringes (or edges) of the fiber. As fibers are usually not perpendicular rectangular to the lines drawn, the distance from the starting point to the fringes is often not the same to all sides. Advantageously the methods of the present invention move the center of the growing circle diameters until it finds a position where the circle hits the fringes of the fiber on opposite sides virtually connected by a straight line through the center point. Furthermore, the method accounts for the fact that a starting point for the growing circles can be in the area of a cross section of fibers. By a special and enhanced way, the starting point is moved out of this area. Finally an image is saved showing all the circles used for measuring the fiber diameters and also a report is provided with data obtained, e.g. fiber diameters and fiber distances. The measuring of the fiber diameters itself is fully automatic and does not require any user input. Moreover the program is not limited to analyzing one image but loops over a predefined image stack.

The methods disclosed herein applied for the automatic determination of the fiber diameter distribution of fibrous media samples are a combination of a specific usage of actual scanning electron microscope images (or alternately model generated images such as virtual SEM images), image processing routines and the newly developed methods for placing the measuring points and obtaining the fiber diameter of the present invention. The methods may be implemented in computer executable code by any single variety or a combination of known varieties of computer coding languages and methods, a few non-limiting examples including C or C++ programs, Java™, or as code executed by simulation tools such as (for example) MatLab™.

FIGS. 9 & 10

Figure 9:
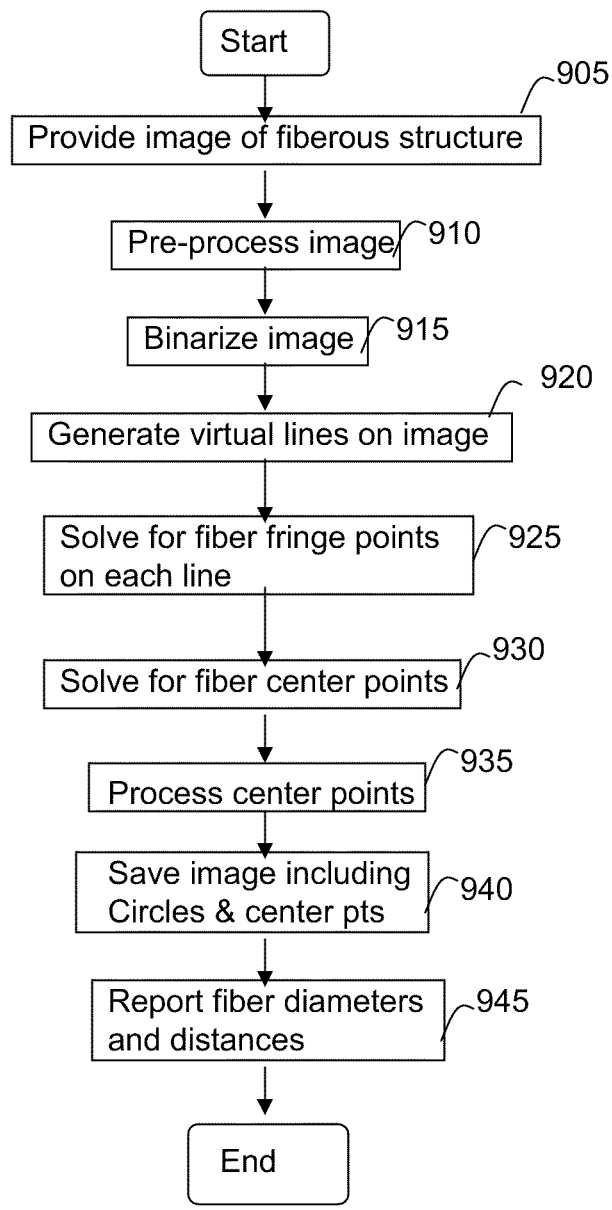
FIGS. 9 and 10 presents flow diagrams illustrating another embodiment of a computer executed method of automatic determination of the fiber diameter distribution of fibrous media samples, consistent with the present invention.
Figure 10:
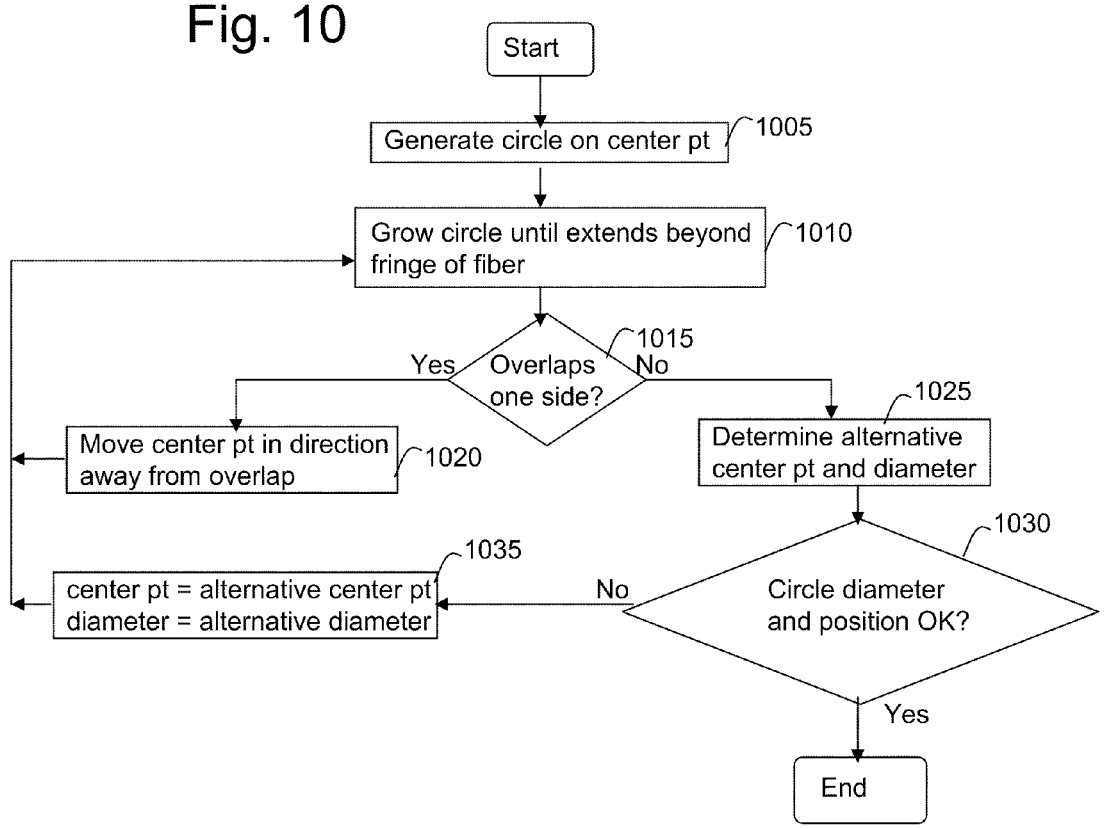

The discussion is first directed to FIGS. 9 and 10, illustrating a first and easier to understand embodiment of a computer executed method of automatic determination of the fiber diameter distribution of fibrous media samples, consistent with the present invention.

The method begins at block 905 by providing a digital computer readable image that is representative of a fibrous structure to be analyzed. Images may include XCT raw images of flat filter media sheet samples, scanning electron microscope (SEM) images of real filter media, or alternately may be virtual high resolution SEM-like images such as a Reflection Electron Microscope (REM) images of virtual fiber media structures such as generated by GeoDict™ GeoDict™ is a material design and simulation software package developed and marketed by the Fraunhofer Institut Techno- and Wirtschaftsmathematik of Kaiserslautern, Germany.

SEM images of actual filtration media may be produced utilizing a scanning electron microscope having a QBSD material detector. By QBSD we mean a "Quadrant Back Scattering Detector" which is a detector that collects the backscattering electrons produced in the sample region irradiated by the electron beam of the SEM.

At block 910 the image is pre-processed. Pre-processing uses image manipulation methods to enhance the quality of the input image upon which the fiber detection algorithms will work. Pre-processing may include any or all of the following: adjusting contrast (expanding the range of grayscale values of pixels in the image), noise reduction (reducing digital noise in the image by use of computer implemented pixel averaging filtering techniques), At block 915 the image is binarized (converting the grayscale image to a black and white image, where pixels values are limited to black (0) or white (1)). The binarization step may also include a cleansing step (identifying and removing smaller disconnected areas of white pixels left by the binarization step). These image manipulation techniques disclosed for block 910 and 915 are discussed in greater detail later with FIG. 2 below.

At block 920 virtual lines are generated on the image. All the generated lines are parallel and may be generated at a uniform spacing on the image, although uniform line spacing is not required. The lines may be positioned in any direction, such as horizontal, vertical or at any angle.

Fiber fringe points are solved at block 925. Fringe points are the points on the generated lines where pixel value change from 0 to 1 or from 1 to 0, indicating transition from a fibrous region to a non-fibrous region of the line and are indicative of the edge of the fibers at the location where the generated lines intersect the fibers.

At block 930 fiber center points are solved. Fiber center points are selected as points on the generated line portion inside of a fibrous region (pixel value 1) and midway between two fringe points. Locations of these points may be adjusted in other steps disclosed below.

Then at block 930, all fiber center points (center points on all generated lines) are processed. This method is illustrated in FIG. 10. FIG. 10 presents a method that is applied sequentially and individually to all fiber center points. At block 1005 a circle is generated on the center point. The diameter of the circle may be a specified minimum fiber size, a predefined percentage of the diameter of a minimum fiber size, or a percentage of the length of a line connected the fringe points determining this center point. In any event, a small size circle is initially generated.

At block 1010 the circle is grown in size in pre-defined steps until portions of the circle extend beyond the fringe of the fiber.

Then at block 1015 a test is made to determine if the circle overlaps only on one side of the circle center point, or at two sides of the center point (i.e.: overlapping opposing fringes of the fiber). If the overlap occurs only on one side, then block 1020 moves the center point in a direction away from the overlap. For example, using a line connecting the circle center point to the circle portion extending over the fringe, move the circle center point a predefined distance in a direction away the circle portion extending over the fringe. Control then transfers back to 1010.

Block 1025 is reached if the circle overlap occurs over opposing fringes (opposing sides) of the fiber. In block 1025 an alternative circle center point is a determined by connecting the opposing overlap portions of the circle by a line and using the center of this line as a new alternative center point.

In one embodiment, the overlap portions may be represented as a plurality of pixels. Lines are generated to interconnect pixels at opposing overlap portions. Potential alternative circle center points are calculated as the midpoints of the lines connecting opposing overlapping pixels, and the potential alternative center point furthest from the current circle center point is chosen as the alternative center point.

A predefined percentage of the length of the line determining the alternative center point as alternative circle diameter.

At block 1030 a test is made to see if the line connecting the opposing overlap portions of the circle passes through or in a predefined distance to the center of the circle. If the test succeeds, then the measurement circle manipulation is complete and the fiber diameter is taken as the diameter of the circle. Otherwise at block 1030 control transfers to block 1035 to set the circle center point to the alternative center point and the circle diameter to the alternative circle diameter, and control transfers back to block 1010.

Now returning to FIG. 9, after all fiber center points are processed and fiber diameter sizing circles are generated, positioned and sized (FIG. 10), the method continues at block 940. At block 940 the modified image is saved to a digital medium including the generated fiber diameter circles (measurement circles) and fiber center points.

At block 945 calculated fiber diameters, fiber spacing (distances between fiber center points) and fiber center point locations are reported. Further post-processing may be performed in order to identify and eliminate incorrect measurements of fiber diameters. This post-processing may be automatic, or may be interactive wherein a user identifies measurements to ignore by picking measurement circles on a graphics display (for example) using a location picking means such as a touch screen, mouse or trackball. The final fiber measurement report data can be sent to a data file, or directly into a tool for further calculations and reporting, such as a spreadsheet. Calculated result data including fiber diameters and fiber distances may undergo further analysis during the reports step such as to calculate minimum, maximum, mean and standard deviation of fiber diameters and fiber distances. Plots may be generated including a fiber diameter plot (relative frequency vs. fiber distance) and fiber distance distribution (relative frequency vs. fiber distance) for the measured fibrous media.

The method then terminates.

According to another embodiment of the present invention, the methods of FIGS. 9 and 10 may be modified as follows. A user may select interactively select a fiber to measure by making a mouse click on the fiber in a computer displayed image of the fiber. A virtual line (block 920, FIG. 9) may then be generated through the mouse click to find fringe points of the fiber (block 925 FIG. 9), then the method continues at 930 FIGS. 11A-11F

FIGS. 11A-11F are binary fibrous images illustrating the method of FIGS. 9 and 10, consistent with the present invention.

Figure 11A:
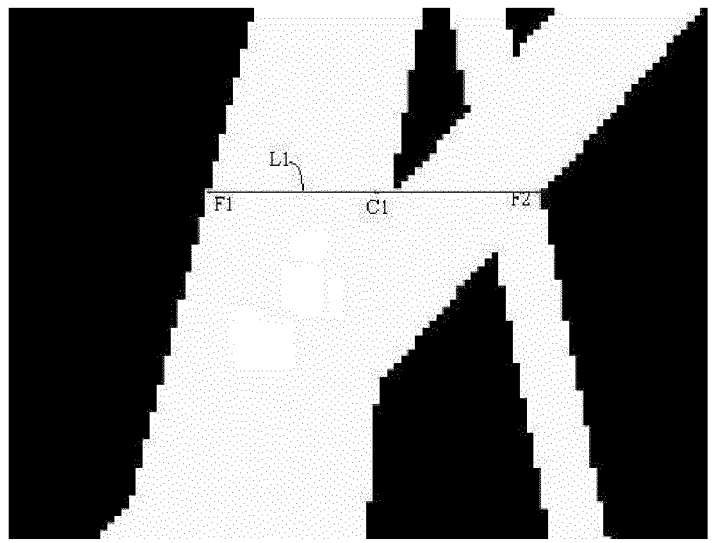
FIGS. 11A-11F are binary fibrous images illustrating the method of FIGS. 9 and 10, consistent with the present invention.

Referring now to FIG. 11A. FIG. 11a presents binarized SEM-like image in which two fiber fringe points F1 and F2 have been calculated (as described at block 925 above), points located on a virtual line L1 (as described in 920 above). A center point C1 calculated as in 930 above is shown.

Figure 11B:
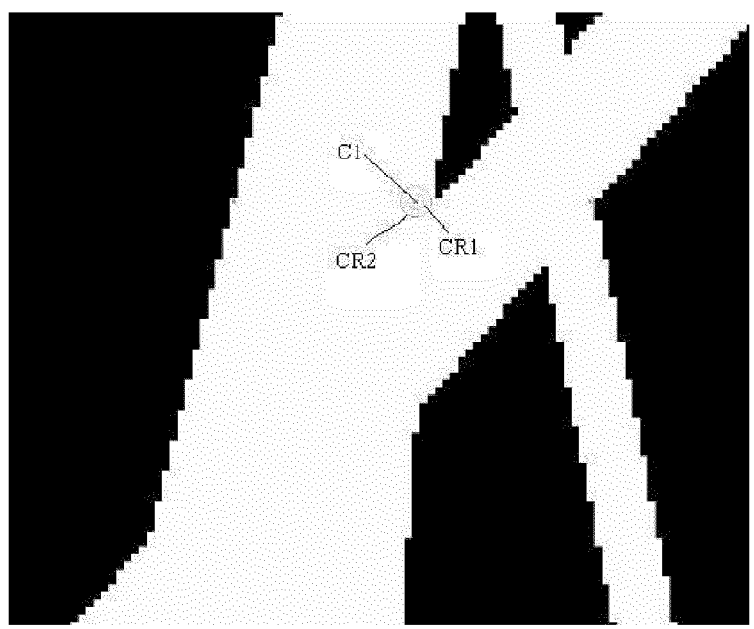

In FIG. 11B, a first circle CR1 is drawn about center point C1. Then a larger circle CR2 is drawn about the same center point C1, as presented in 1005 and 1010 of FIG. 10.

Figure 11C:
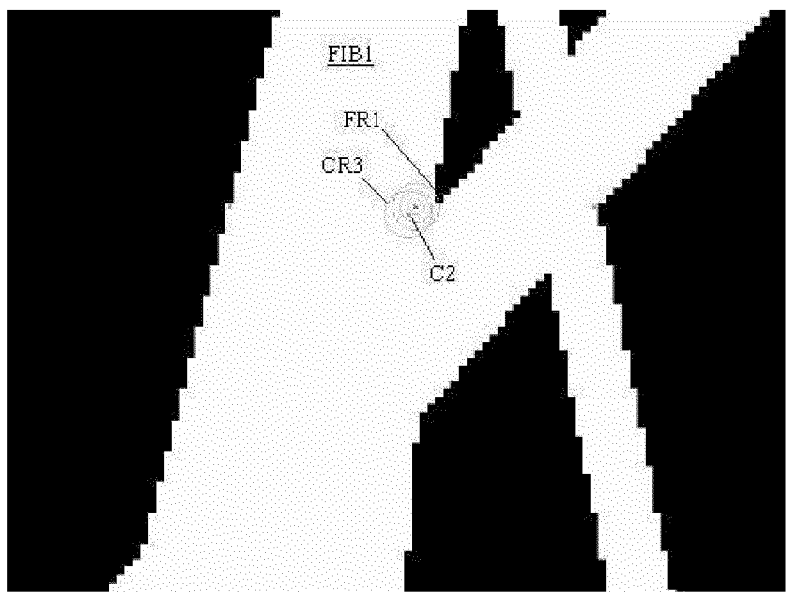

In FIG. 11C, circle CR2 can be seen to overlap or extend beyond the fringe FR1 of the fiber FIB1. Therefore a new circle center point is calculated in a direction away from the overlap (block 1020 above) and a new set of circles are grown on this moved center point.

Figure 11D:
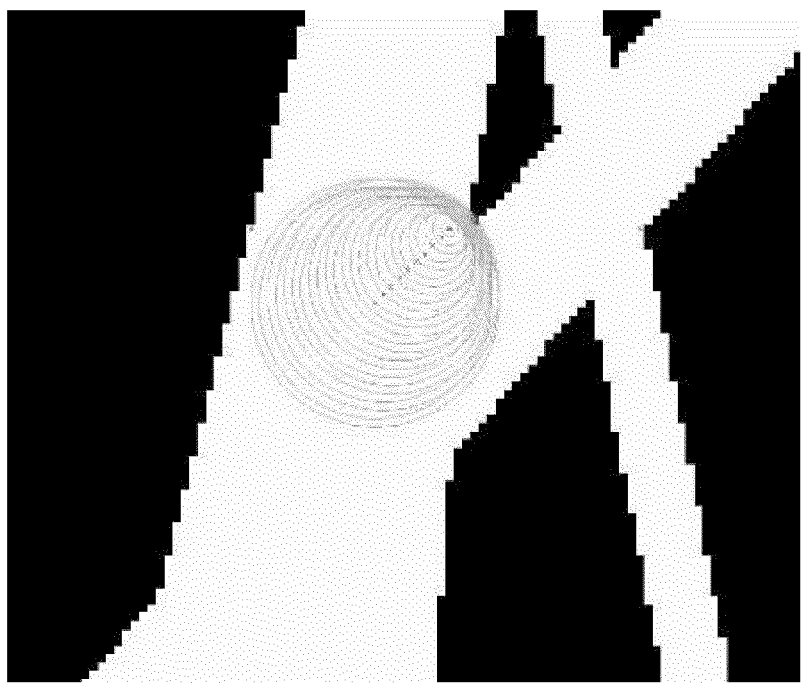

FIG. 11D shows a further progression of growing circles and relocated center points, according to the method of 1010, 1015 and 1012 discussed above.

Figure 11E:
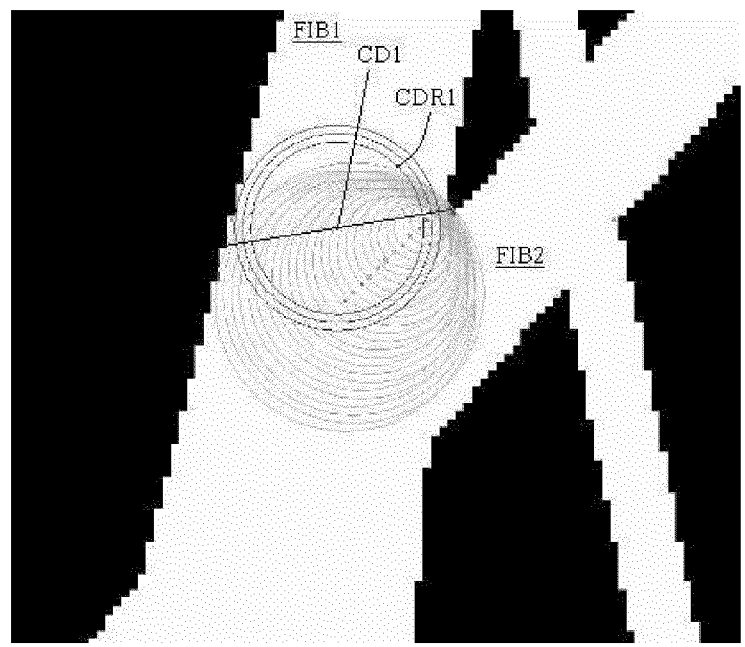

FIG. 11E shows the growing relocated circles eventually intersecting opposing sizes (opposing fringes) of the fiber. A new circle center point CD1 is calculated as in 1025, 1030 and 1035 above, thereby moving or walking the circle upwards along the fiber FIB1 to circle CDR1 and advantageously moving the measurement circles out of the intersection between fibers FIB1 and FIB2. The ability to relocate fiber measurement circles away from such fiber intersections is an advantage of the method disclosed here, as otherwise leaving the measurement circle at the fiber intersection would result in an incorrect fiber diameter measurement. CDR1 grows about CD1 until it intersects one or both fringes, as discussed earlier.

Figure 11F:
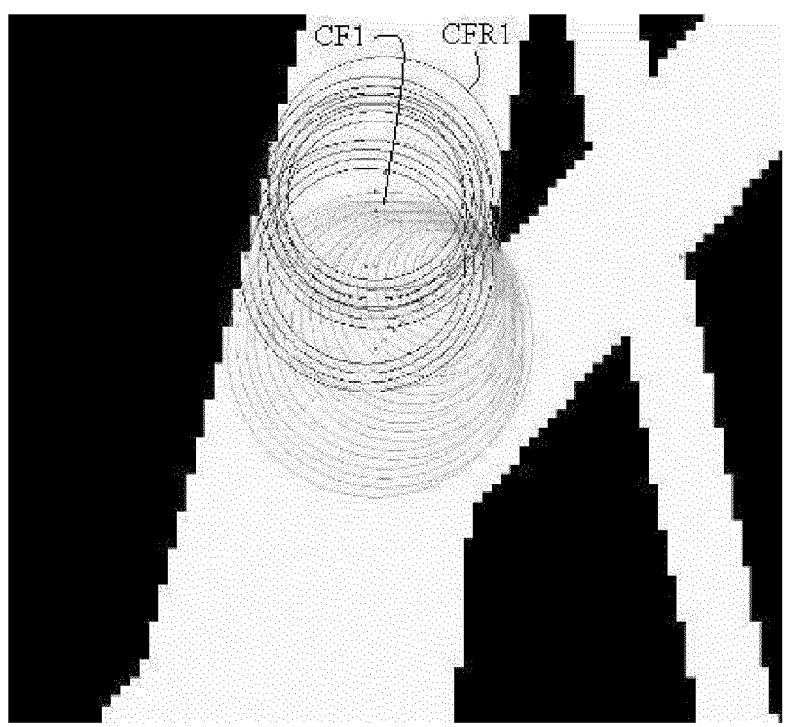

FIG. 11F shown the further progression of measurement circles according to the method of FIGS. 9 and 10. As can be seen in FIG. 11F, stop conditions are met in condition test block 1030 (above) as overlap portions of the circle can be interconnected by a line through the circle center.

FIG. 12

Figure 12:
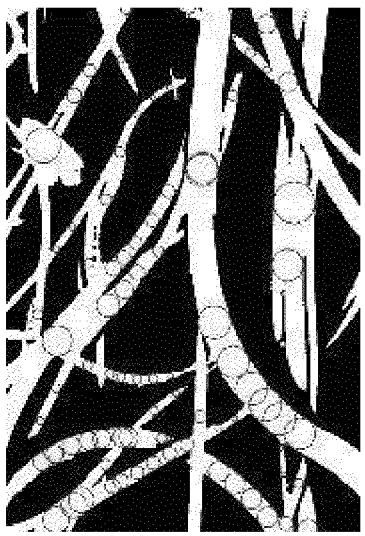
FIG. 12 presents a binarized image as created by the present invention with circles indicating position and size of measured fibers, consistent with the present invention.

FIG. 12 presents a binarized image with circles indicating position and size of measured fibers, as produced according to the methods of the present invention.

FIGS. 1-8

FIGS. 1-8 relate to another specific embodiment of a computer executed method of automatic determination of the fiber diameter distribution of fibrous media samples, consistent with the present invention.

FIG. 1—Method of Automatic Determination of the Fiber Diameter Distribution of Fibrous Media The method begins at block 105. At block 110 images indicative of fiber distribution in filter media are provided. Images may include XCT raw images of flat filter media sheet samples, scanning electron microscope (SEM) images of real filter media, or alternately may be virtual high resolution SEM-like images such as a Reflection Electron Microscope (REM) images of virtual fiber media structures such as generated by GeoDict™. By "Image stack" in block 110, we mean one or more SEM type images in a digital image format suitable for computer processing. Example image formats include JPEG, BMP, TIFF and others as are known to those skilled in the art. SEM images, as used herein, should be understood to refer to both actual SEM or SEM-like images of real fibrous media as well as virtual SEM images of theoretical fibrous media, such as created with GeoDict™ and other fibrous media modeling software.

At block 115 specific modeling parameters are read from a file, input on a computer screen, confirmed with a user or otherwise entered into the system. Modeling parameters that may be entered (for example, on a formatted input screen) include the image input files (SEM image file stack) and the directory where output files (such as report and data files) should be written. Other parameters include the number of lines to be generated on each image. As will be discussed elsewhere, points of intersection of the generated lines with the fringes (or edges) of the fibers in the SEM images will be used to calculate fiber distances and diameters. Other parameters include the resolution of the provided SEM images (ex: in micrometers per pixel), and the maximum expected fiber diameters (ex: in micrometers).

At block 120 pre-processing occurs on the next image from the SEM image stack. Image pre-processing will be discussed in detail in discussions directed to FIG. 2 below and therefore is not elaborated upon here. Briefly, image pre-processing is directed to improving the quality of the image that the fiber detection algorithms of the present invention will work upon to improve and in some cases enable the algorithms and methods of the present invention.

At block 130 line generation and processing occurs. Block 130 represents several block that are expanded upon and will be discussed in detail with FIG. 3 later below. Essentially, line generation and processing refers to the generation of lines in images and determination of fiber edges and center points.

At block 135 Fiber distance calculations are performed. Calculations are performed to determine the distance between center points of fibers in the image. Fiber center points were calculated earlier in block 130 from fiber fringe points. Fiber distances are the distances between individual fibers as determined by distances between fiber center points for a given (the current) generated line on the image. Fiber distances can be calculated between individual fibers and neighboring fibers the generated line intersects. A minimum, maximum and bell curve distribution may be calculated for the fiber distance distribution in the media.

Block 140 is a condition test block. If more lines remain to be worked (generated and processed), then control transfers back to block 130—line generation/processing. Blocks 130 (method outlined in FIG. 3), 135 and 140 form a programmatic conditional loop. If all lines have been worked, then control transfers to block 145.

At block 145 the fiber diameters are determined using custom methods and algorithms of the present invention. Fiber diameter determination is discussed in detail with FIG. 4 below and will not be elaborated on here.

Block 150 is a condition test block. If more fiber center points remain to be processed for fiber diameter determination, then control transfers back to block 145. If all fiber center points are processed, then control transfers to block 152.

Block 152 is a condition test block. If all images in the SEM image input stack have been processed then control transfers to block 155, otherwise control transfers back to block 120 to pre-process the next SEM image from the stack. Blocks 120 through 152 form a programmatic loop to process and calculate fiber diameters and spacing for all provided SEM images.

At block 155, data analysis and visualization of results occurs. This includes an image or images showing the generated circles used to measure fiber diameters. Calculated result data including fiber diameters and fiber distances and calculation of minimum, maximum, mean and standard deviation of fiber diameters and fiber distances. Plots are generated including a fiber diameter plot (relative frequency vs. fiber distance) and fiber distance distribution (relative frequency vs. fiber distance) for the measured fibrous media. Further analysis and plots can be generated directly in the computer code, or may be offload to a packaged programmable solver and report tool such as Microsoft Excel™ for one example of a spreadsheet/calculation tool. Data may be transferred into the solver and report tool utilizing known methods such as the programmatic method described above storing data to comma separated variable (CSV) files, or direct linking using methods supported by such tools including Dynamic Data Exchange (DDE), SQL or ODBC (Open DataBase Connectivity).

At block 199 the process ends.

Figure 2:
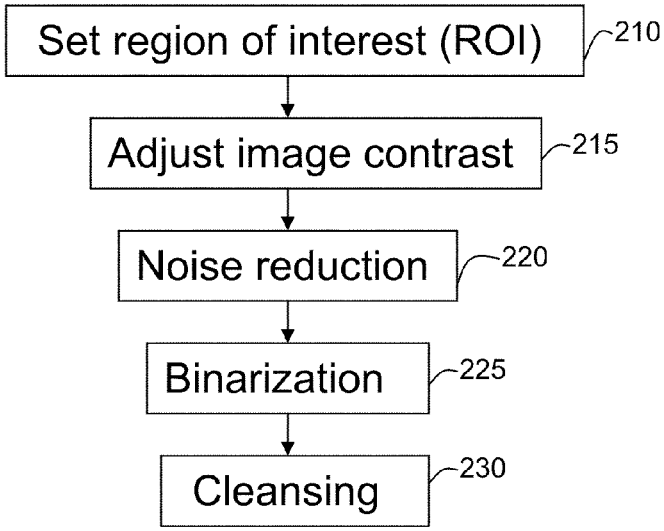
FIG. 2 presents a flow diagram illustrating a method of image preprocessing, consistent with the present invention.

FIG. 2—Method Steps Performed in Image Pre-Processing

FIG. 2 represents block 120 of FIG. 1 expanded in further detail for a clearer understanding and begins with block 210 of FIG. 2. The method steps of FIG. 2 utilize image manipulation methods to enhance the quality of the input images (the SEM image stack) upon which the fiber diameter determination algorithms of the present invention will operate.

At block 210 the region of interest (ROI) of the image is selected. The region of interest may be selected as a subset of the SEM image. At block 215 the image contrast is automatically adjusted. In this step the image is analyzed and the grayscale value range of pixels in the image is evaluated. If the range is not completely used, then the grayscale values are expanded such that the grayscale fills the available range, thereby enhancing the contrast of the image. This enhanced contrast is advantageous for image analysis.

At block 220 image noise reduction occurs. At this step an averaging filter is employed. In one embodiment, the averaging filter operates on a 2×2 block of image pixels at a time, although the selected pixel manipulation size is not limiting. The averaging filter is employed to reduce so called digital noise in the image. By digital noise we mean jumps in intensity of adjacent gray pixels present in the SEM input image. The averaging filter calculates the mean value of every 2×2 field in the image and assigns this mean value to the 4 pixels in the 2×2 block of pixels. The process repeats for all pixels in the SEM image. Preferably the averaging filter operates on 2×2 pixel blocks, this limited size reduces image information loss attributable to the averaging process.

At block 225 binarization of the contrast adjusted, noise reduced image occurs. The gray value (grayscale) image is binarized, meaning converted into a black and white image (2 color planes). This process involves finding a threshold grayscale value this is used to assign either a binary 0 or binary 1 to all pixels in the image, depending on their value below or above the calculated threshold value. The determination of the optimum threshold value is important in segregating fibers in the image from the background. In the present invention, the threshold is calculated using Otsu's method, which is a well-known thresholding method to those skilled in the art. Otsu's method is based upon a very simple idea: Find the threshold that minimizes the weighted within-class variance. This turns out to be the same as maximizing the between-class variance.

At block 230 cleansing of the binarized image occurs. In the cleansing step, computer code examines the binarized black and white) image, looking for disconnected areas of white pixels. These areas originate mostly from fibers in the background of the image which have smaller grayscale values (darker) in the original image, and also from small areas with higher grayscale values where they are not shaded from fibers in the foreground. As these disconnected areas are not representative of the true fiber size (diameter and length) they would falsify the diameter detection results and are therefore removed from the image by setting these regions to black (fibers are shown as white regions).

Figure 3:
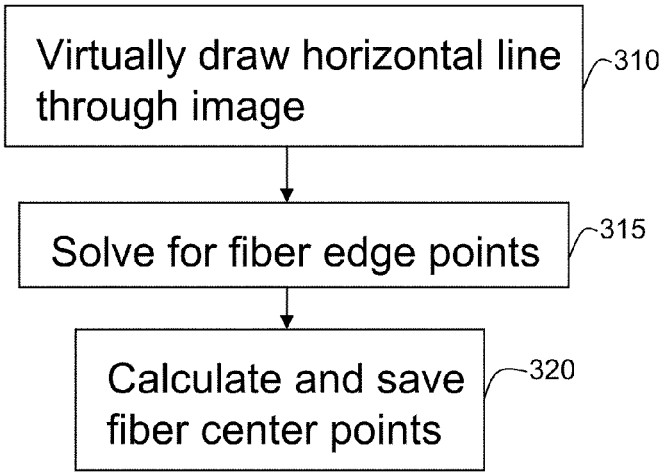
FIG. 3 presents a flow diagram outlining method steps performed in line generation processing, consistent with the present invention.

FIG. 3—Method Steps Performed in Line Generation Processing

FIG. 3 represents block 130 of FIG. 1 expanded in further detail for a clearer understanding and begins with block 310 of FIG. 3. At block 310, a line is virtually drawn across the binary image. Previously (at FIG. 1, block 115) the number of lines to be drawn on the image was specified. If this is the first or last line on the image, the computer code takes into account that the line has tom be at least the size of the maximal fiber diameter (parameter specified at block 115) away from the top and bottom limit of the image. The number of lines to be drawn on the image then determines the equally spaced distribution of lines therebetween.

At block 315 pixels on the line are processed in the binary image to identify fiber fringe (or edge) points. Edge points are identified in the line as points along the line where the pixel value changes from 0 to 1 or from 1 to 0. Fibers in the image are indicated by the white (pixel value=1) portions of the line.

At block 320 fiber center points are then calculated as the mean between each pair of fiber edge points.

Figure 4:
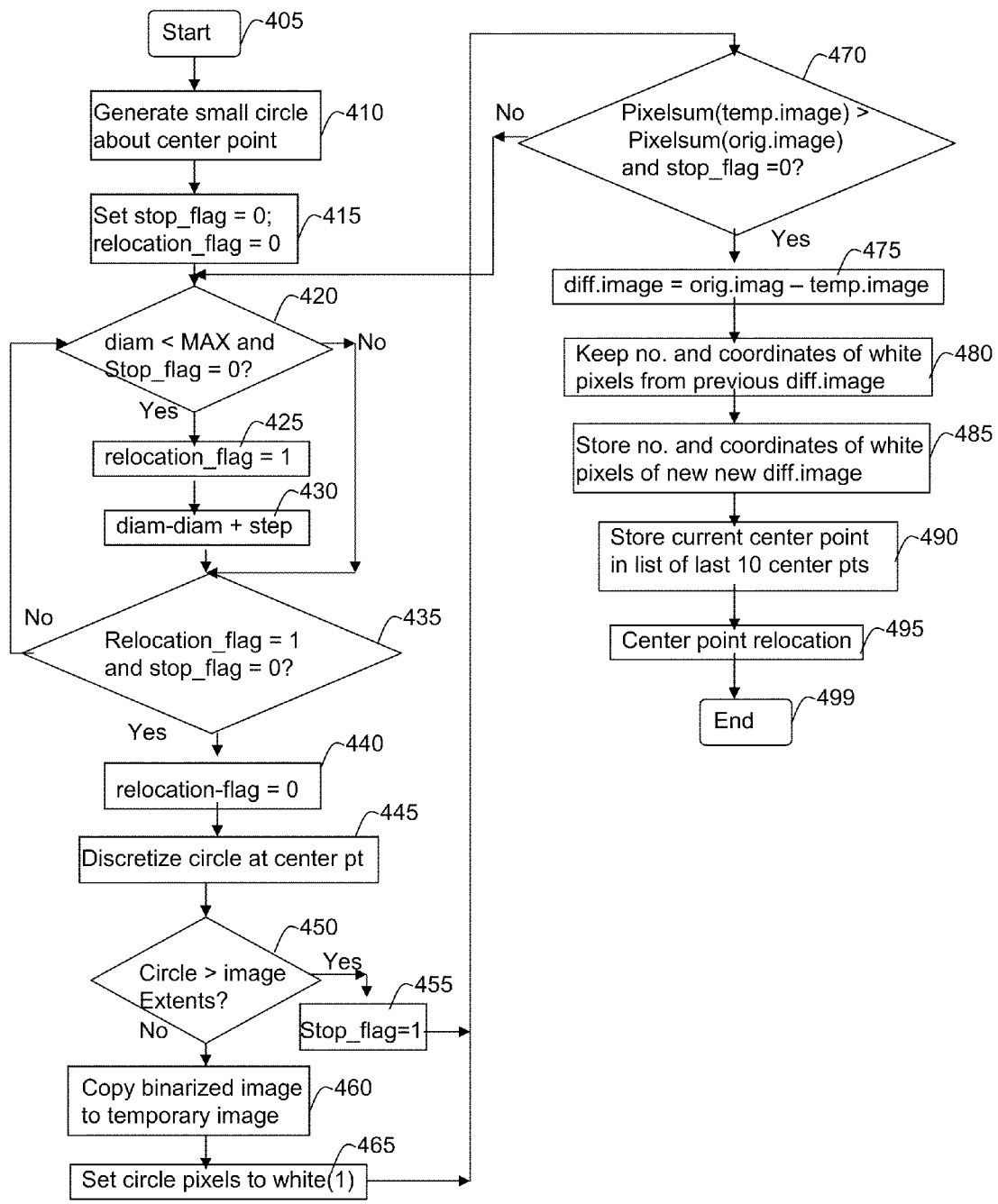
FIG. 4 presents a flow diagram outlining a method of determining fiber diameter, consistent with the present invention.

FIG. 4—Method of Determining Fiber Diameter

The method begins at block 405. As can be understood from FIG. 1, fiber center points are processed individually. At block 410 a small circle is generated about the fiber center point. At block 415 the stop_flag and relocation_flag are both cleared (set to zero). Block 420 is a conditional test block. If the circle diameter is less than the maximum fiber diameter (parameter entered in FIG. 1, block 115) and the stop_flag is clear then control transfers to block 425, otherwise control transfers to block 435.

At block 425 the relocation_flag is set (set value to 1) to assure at least one run. Then at block 430 the circle diameter is increased by a predefined step.

Block 435 is a conditional test block. If the relocation_flag is set and the stop_flag is clear, then control transfers to block 440, otherwise to block 420.

At block 440 the relocation flag is cleared. Then at block 445 a circle at the circle diameter diam is discretized or generated about the center point and the circle is saved in a variable.

Block 450 is a conditional test block. If the circle has a portion thereof that exceeds the image extents (image limits in X and Y indicating the circle is too large to be used), then control transfer to block 445 otherwise to block 460.

At block 455 the stop_flag is set and control transfers to block 470.

At block 460 (reached if the circle does not exceed image extents) the binarized image is copied (stored) to a temporary image. Then at block 465 the circle pixels are set to white (pixel value=1) in the temporary image.

Block 470 is a conditional test block. Pixelsum( ) represents a computer execute method or function to compute the sum of pixels in an image. It is the sum of all image pixels. For an example, in Pascal, the pixel sum of a 600×600 image could be computed as:

```
begin
  Pixelsum := 0;
    for x := 1 to 600 do
      for y := 1 to 600 do
        Pixelsum := ImagePixels[x, y] + Pixelsum;
end;
```

At block 470, if the Pixelsum( ) of the temporary image is greater than the Pixelsum( ) of the original image (the binarized image before the pixels set to white), then the circle has extend beyond the edge of the fiber, control transfers to block 475 otherwise block 420 to further grow the circle.

At block 475 the difference image diff.image is computed by subtracting the temporary image from the image on a corresponding pixel by pixel basis. The diff.image will contain black pixels except in the areas where the circle extends beyond the fiber fringe or edge. These pixels will be white.

At block 480 the number of white pixels and their coordinates from the previous run are stored so as not be overwritten. Then at block 485 the number of white pixels and their location in the new difference image (block 475) is stored.

At block 490 the current center point is added to a stack (or list) of the last ten center points.

At block 495 the center point relation begins. Center point relocation is expanded upon in FIG. 5.

Figure 5:
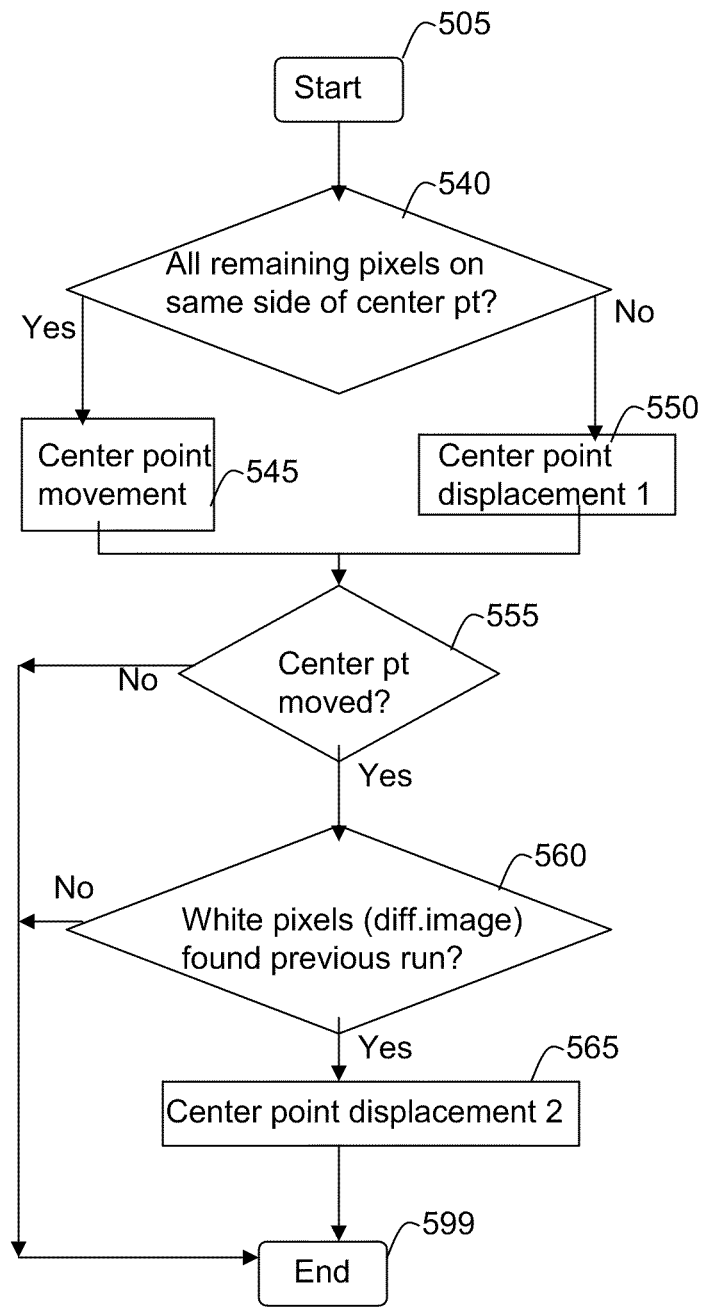
FIG. 5 presents a flow diagram outlining a method for relocating the center point of measurement circles, consistent with the present invention.

Block 499 ends the fiber diameter determination method.
FIG. 5—Method for Relocating the Center Point of Measurement Circles.

FIG. 5 represents block 495 of FIG. 4 but expanded in further detail for a clearer understanding of the method. The method begins at block 505.

Then at block 540 a test is made to see if all remaining pixels in the difference image (diff.image) are on the same side of the center point. If all remaining pixels are on the same side then control passes to block 545 for center point movement, otherwise control passes to block 550 for center point displacement.

Block 545 handles circle center point movement. Block 545 is further expanded on FIG. 6 and will be discussed with FIG. 6 below.

Block 550 handles center point displacement method 1. Block 550 is further expanded on FIG. 7 and will be discussed with FIG. 7 below.

Block 555 is a condition test block. If the center point was moved then control passes to block 560 otherwise to block 599.

At block 560 a test is made it determine if white pixels were found in the diff.image (difference image) from the previous run. If the condition is met, then control passes to block 565 otherwise to block 599.

Block 565 handles center point displacement according to method 2. Block 565 is further expanded on FIG. 8 and will be discussed with FIG. 8 below.

Figure 6:
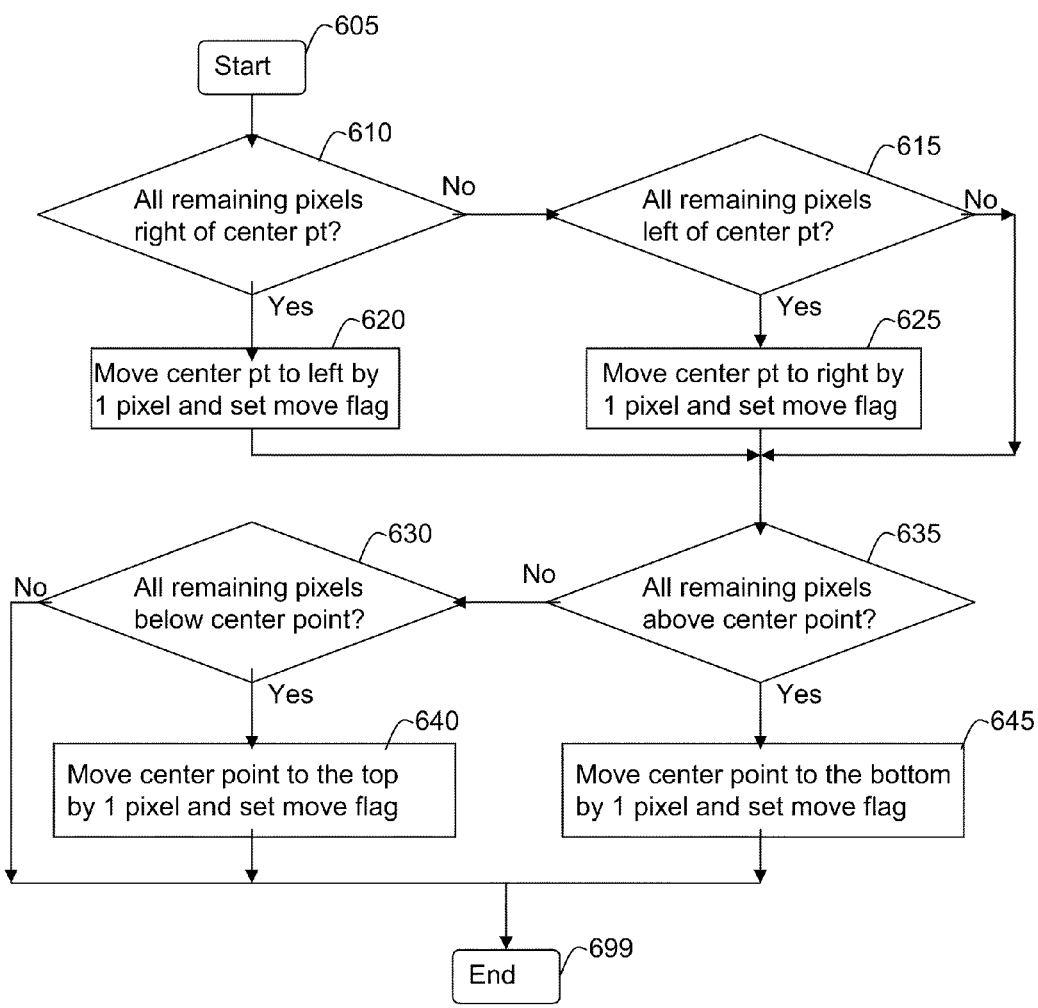
FIG. 6 presents a flow diagram outlining a method of measurement circle center point movement (at same diameter), consistent with the present invention.

Block 599 terminates the center point relation method.
FIG. 6—Method of Measurement Circle Center Point Movement (at Same Diameter)

This method handles measurement circle center point movement. If a portion of the circle extends outside of the fiber on only one side of the fiber, then the center point must be move to better position the center point towards the fiber center.

The method starts at block 605. At block 610 a test is made to see if all remaining pixels in the current diff.image are on the right side of the center point. If true, then control passes to block 620, otherwise to block 615. At block 620 the circle center point is moved to the left by one pixel and the move flag is set.

At block 615 a test is made to see if all remaining pixels are left of the center point. If true control passes to block 625 otherwise passes to block 635. At block 625 the center point is moved to the right by 1 pixel and the move flag is set.

At block 635 a test is performed to see if all remaining pixels are above the center point. If the condition is true, then control transfers to block 645 where the center point is moved towards the bottom (down the image) by one pixel and the move flag is set. Otherwise control transfers to block 630.

At block 630 a test is performed to determine if all remaining pixels are below the center point. If this condition is true then control transfers to block 640 and the center point is moved towards the top of the image (upwards on the image) by 1 pixel and the move flag is set.

Figure 7:
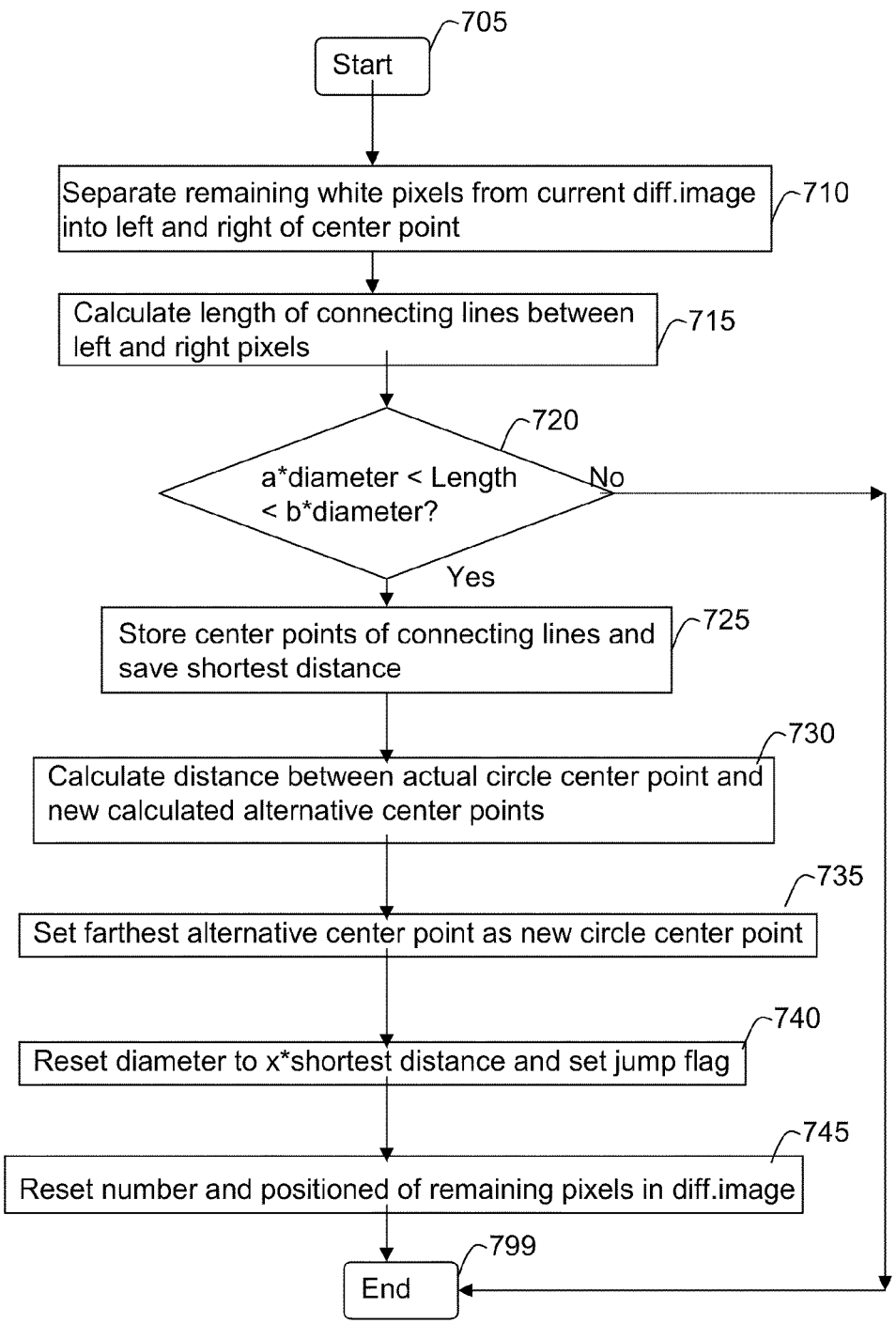
FIG. 7 presents a flow diagram outlining a method of center point displacement, consistent with the present invention.

Block 699 ends the measurement circle center point movement method.
FIG. 7—Method of Center Point Displacement (Method 1)

In this method the measurement circle overlaps the fiber structure and the overlap (white pixels) exist on more than one side of the center point.

The method starts at block 705. At block 710 the white pixels in the current diff.image (difference image from the current run) are separated according to either left or right of the center point.

At block 715 the lengths (distances) of connecting lines between the left and right pixels are calculated (distances between all pixel pairs).

At block 720 a condition test if made to find the calculated pixel pair distance within the range (a*diameter< Length<b*diameter) to assure the pixels of the pair are located on different quarters of the circle, otherwise the shortest distance would clearly be the distance between two adjacent pixels. An example value for 'b' is 0.95 as distances greater than or equal to the current circle diameter are not useful as the circle diameter is already larger than the fiber diameter (as the circle overlaps opposing sides of the fiber). Variable 'a' is either 0.7 or 0.9 depending upon the diameter of the circle. For circle diameters smaller than 15 pixels 0.9 is taken, otherwise 0.7 is used. The reason for this is that edges of the fibers in the binary image are not smooth but instead course with little bumps. With a lower boundary of 0.7 for small circles the probability increases that the algorithm migrates into such little bumps, which often have a size of several pixels. To avoid this condition the lower boundary is increased for small circle diameters.

If a satisfactory pixel distance is found in block 720 then block 725 is executed to store the center points of the calculated connecting lines and to save the shortest distance.

At block 730 the distances between the actual (current) circle center point the new calculated alternative center points (from block 720) are calculated. At block 735 the farthest alternative center point (greatest distance) is saved as the new circle center point.

At block 740 the circle diameter is reset to x*shorted distance (from block 730) and the jump flag is set. In this block the diameter of the circle needs top be decreased as the current circle was too large (overlapped both sides of fiber). A suitable value of 'x' is 0.75, which reduces the circle diameter to 75% of the smallest calculated distance (block 730) assuring that the circle lies completely within the fiber structure for the next run.

At block 745 the number and positions of remaining pixels in the difference image (diff.image) are reset (cleared).

The method ends at block 799.

Figure 8:
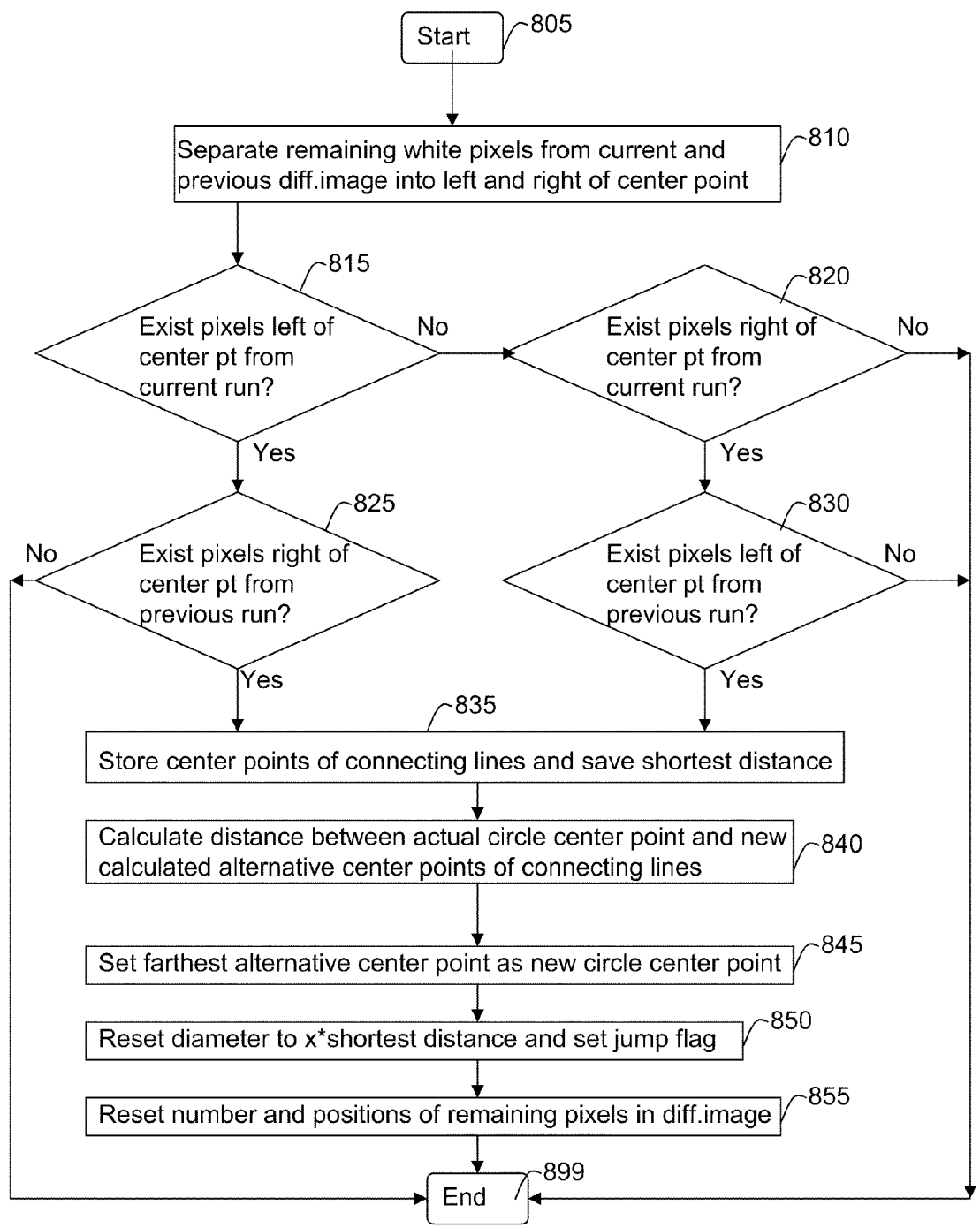
FIG. 8 presents a flow diagram outlining another method of center point displacement, consistent with the present invention.

FIG. 8—Method of Center Point Displacement (Method 2)

The method begins at block 805. At block 810 the remaining pixels (white pixels) in the current and in the previous difference image (diff.image) are separated into those to the left and those to the right of the circle center point.

At block 815, if pixels exist left of the center point from the current diff.image, then control transfers to block 825, otherwise block 820.

At block 820, if pixels exist right of the center point from the current diff.image, then control transfers to block 830, otherwise block 899.

At block 825, if pixels exist right of the center point from the previous diff.image, then control transfers to block 835, otherwise block 899.

At block 830, if pixels exist left of the center point from the previous diff.image, then control transfers to block 835, otherwise block 820.

At block 835 a procedure occurs similar to that discussed with block 720 of FIG. 7. At this step the distances between pairs of pixels (pixels selected from the pool of current and previous diff.image) are calculated and the pair with smallest distance that meets the criteria (a*diameter<Length<b*diameter) is selected. Again an example value for 'b' is 0.95 as distances greater than or equal to the current circle diameter are not useful as the circle diameter is already larger than the fiber diameter (as the circle overlaps opposing sides of the fiber). Variable 'a' is either 0.7 or 0.9 depending upon the diameter of the circle as discussed with block 720. The center points of the calculated connecting lines and the shorted calculated pixel distance (meeting the above criteria) is saved.

Then at block 840 the distances between the actual (current) circle center point and the new calculated alternative circle center points (center points of connecting lines) are calculated.

At block 845 the farthest alternative center point is selected according to the calculated distances, and the point is stored as the new circle center point.

At block 850 Then the circle diameter is reset to x*shorted distance, where a suitable value for 'x' is 1.5. At block 855 the number and positions of remaining pixels in the current difference image diff.image are reset (cleared).

The method terminates at block 899.

FIG. 13

Figure 13:
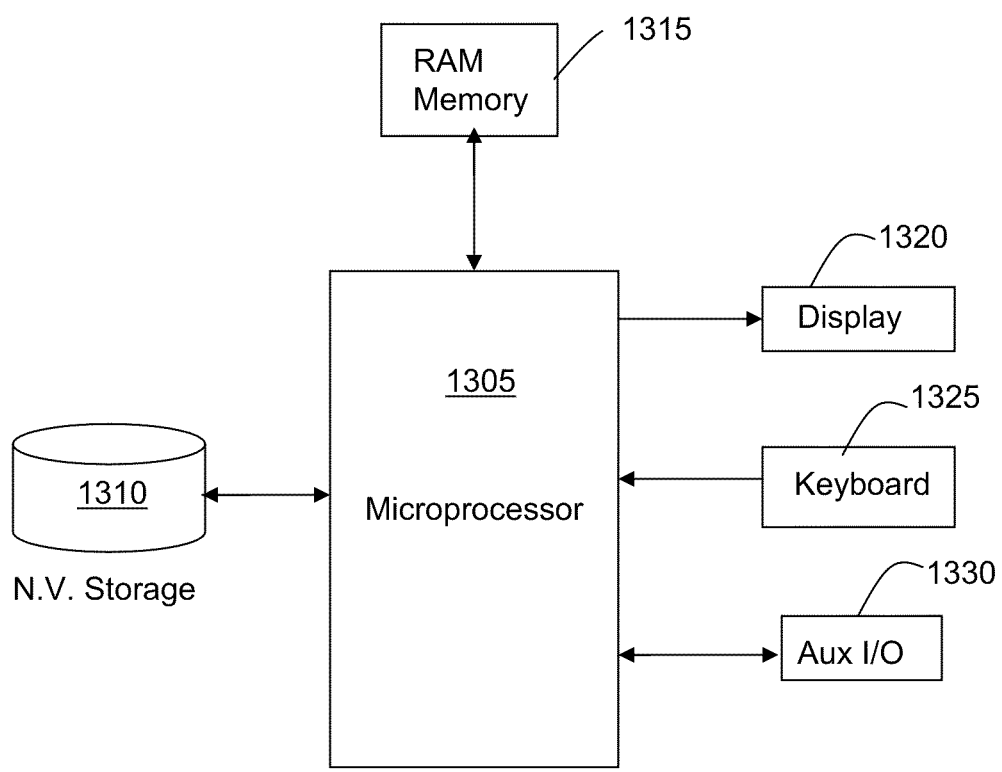
FIG. 13 presents a schematic diagram of a microprocessor based computing system suitable for executing the method of the present invention.

FIG. 13 presents a schematic diagram of a microprocessor-based computing system suitable for executing the methods of the present invention. The system includes a microprocessor 1305, which communicates with a non-volatile storage device 1310, such as a hard disk or other non-volatile memory. An operating system and executable computer code implementing the methods of the present invention may be stored on the device 1310, as well as input image files, output data files, reports, etc. Display 1320 and keyboard 1325 provide user input/output devices suitable for human interaction with the methods of the present invention. The system may include auxiliary I/O 1330 for communication with other external devices as desired. Random access memory 1315 provides working storage for the microprocessor-based system to execute the methods of the present invention.

Advantageously, the methods of the present invention provide a computer executable method of determining fiber diameter distribution of a fibrous media that overcomes limitations of the prior art methods and eliminates the need to have an operator count fibers in a SEM image.

Advantageously, the methods of the present invention provide a useful tool in determining fiber size and distribution for modeling filter media parameters such as pressure drop and dust capacity during the filter development stage.

Advantageously, the methods of the present invention allow control of the quality of measuring fiber diameters of virtual or actual fibrous structures. In contrast to the mathematical methods applied in image processing by others, the methods of the present invention utilize fiber measurement circles that are drawn on the image or images from with a person can easily observe and determine if the calculations are correct or incorrect.

Advantageously the methods of the present invention move the center of the growing measurement circle until it finds a position where the circle hits the fringes of the fiber on opposite sides virtually connected by a straight line through the center point. Furthermore, the method of the present invention accounts for the fact that a starting point for the growing circles can be in the area of a cross section (or intersection) of fibers. By techniques discussed herein, the starting point is moved out of this area preventing an incorrect fiber diameter measurement.

While the best modes for carrying out the invention have been described in detail, those familiar with the art to which this invention relates will recognize various alternative designs and embodiments for practicing the invention within the scope of the appended claims.

The invention claimed is:

1. A method of determining fiber diameter distribution of a fibrous media, comprising:

providing at least one digital image representative of said fibrous media;

pre-processing said image to enhance image quality;

binarizing said image to produce a binarized image representative of structure of said fibrous media;

generating virtual lines on said binarized image;

solving for fiber fringe points on each of said generated lines;

solving for fiber center points as a mean of said fringe points on each fiber;

calculating fiber spacing from said fiber center points;

generating and growing measurement circles about said fiber center points until circles intersect at least one fiber fringe;

repositioning said measurement circles and center points as needed to avoid fiber intersections, then resizing said repositioned measurement circles to intersect said opposing fringes;

calculating fiber diameters from said circles;

displaying any of said digital images having said measurement circles drawn thereon; and interacting with an operator to permit said operator to select measurement circles to be ignored in fiber diameter distribution calculations.

2. A method of determining fiber diameter distribution of a fibrous media, comprising:

providing at least one digital image representative of said fibrous media;

pre-processing said image to enhance image quality;

binarizing said image to produce a binarized image representative of structure of said fibrous media;

generating virtual lines on said binarized image;

solving for fiber fringe points on each of said generated lines;

solving for fiber center points as a mean of said fringe points on each fiber;

calculating fiber spacing from said fiber center points;

generating and growing measurement circles about said fiber center points until circles intersect at least one fiber fringe;

relocating said center points and resizing measurement circles so circles intersect but do not extend beyond opposing fringes of said fibers;

repositioning said measurement circles and center points as needed to avoid fiber intersections, then resizing said repositioned measurement circles to intersect said opposing fringes;

calculating fiber diameters from said circles;

displaying any of said digital images having said measurement circles drawn thereon; and interacting with an operator to permit said operator to select measurement circles to be ignored in fiber diameter distribution calculations;

saving at least one image including said circles and said center points; and storing calculated fiber diameters and fiber spacing.

3. The method of claim 2, wherein after the repositioning step the method further comprises:

adjusting said measurement circles so intersection points on opposing sides of said measurement circles lie upon a line extending through said center point of said circle.

4. The method of claim 2, wherein the preprocessing step comprises:

adjusting contrast of said digital images; and performing image noise reduction by way of a pixel averaging filter.

5. The method of claim 2, wherein the binarizing step comprises:

determining a grayscale threshold value using Otsu's method; and using said threshold value to convert said image to a binarized image having only white and black pixel values.

6. The method of claim 2, wherein after the binarization step, the method further comprises cleansing said binarized image to remove disconnected areas not representative of fiber size.

7. The method of claim 2, wherein the relocating step includes if the circle intersects only one fringe of the fiber, moving the center point in a direction away from said fringe intersection.

8. A method of determining fiber diameter distribution of a fibrous media, comprising:

providing at least one digital image representative of said fibrous media;

pre-processing said image to enhance image quality;

binarizing said image to produce a binarized image representative of structure of said fibrous media;

generating virtual lines on said binarized image;

solving for fiber fringe points on each of said generated lines;

solving for fiber center points as a mean of said fringe points on each fiber;

calculating fiber spacing from said fiber center points;

generating and growing measurement circles about said fiber center points until circles intersect at least one fiber fringe;

relocating said center points and resizing measurement circles so circles intersect but do not extend beyond opposing fringes of said fibers;

repositioning said measurement circles and center points as needed to avoid fiber intersections, then resizing said repositioned measurement circles to intersect said opposing fringes;

calculating fiber diameters from said circles;

saving at least one image including said circles and said center points; and storing calculated fiber diameters and fiber spacing;

wherein said lines are generated at a user defined uniform spacing.

9. A method of determining fiber diameter distribution of a fibrous media, comprising:

providing at least one digital image representative of said fibrous media;

pre-processing said image to enhance image quality;

binarizing said image to produce a binarized image representative of structure of said fibrous media;

displaying said image representative of said fibrous media on a display terminal;

interacting with an operator to enable said operator to select at least one fiber to be measured using an interactive location picking input means;

for each selected fiber:

generating a virtual line through said fiber at said location picked by said operator;

solving for fiber fringe points on each of said generated lines;

solving for fiber center points as a mean of said fringe points on each fiber;

generating and growing measurement circles about said fiber center points until circles intersect at least one fiber fringe;

relocating said center points and resizing measurement circles so circles intersect but do not extend beyond opposing fringes of said fibers;

repositioning said measurement circles and center points as needed to avoid fiber intersections, then resizing said repositioned measurement circles to intersect said opposing fringes;

calculating fiber diameters from said circles; and reporting said fiber diameters to said operator.

10. A non-transitory computer-readable medium on which a plurality of executable instructions is stored, the instructions for performing the steps of any of claims 1, 3-9.

11. A computer system for determining fiber diameter distribution of a fibrous media, comprising:

a digital computer processor;

a non-volatile storage device including an operating system;

a display device in communication with said computer processor;

a user input device;

computer executable code resident upon said non-volatile storage device and executable by said computing system, said computer executable code implementing the methods of any of claims 1, 3-9.

* * * * *